Patented Mar. 7, 1944

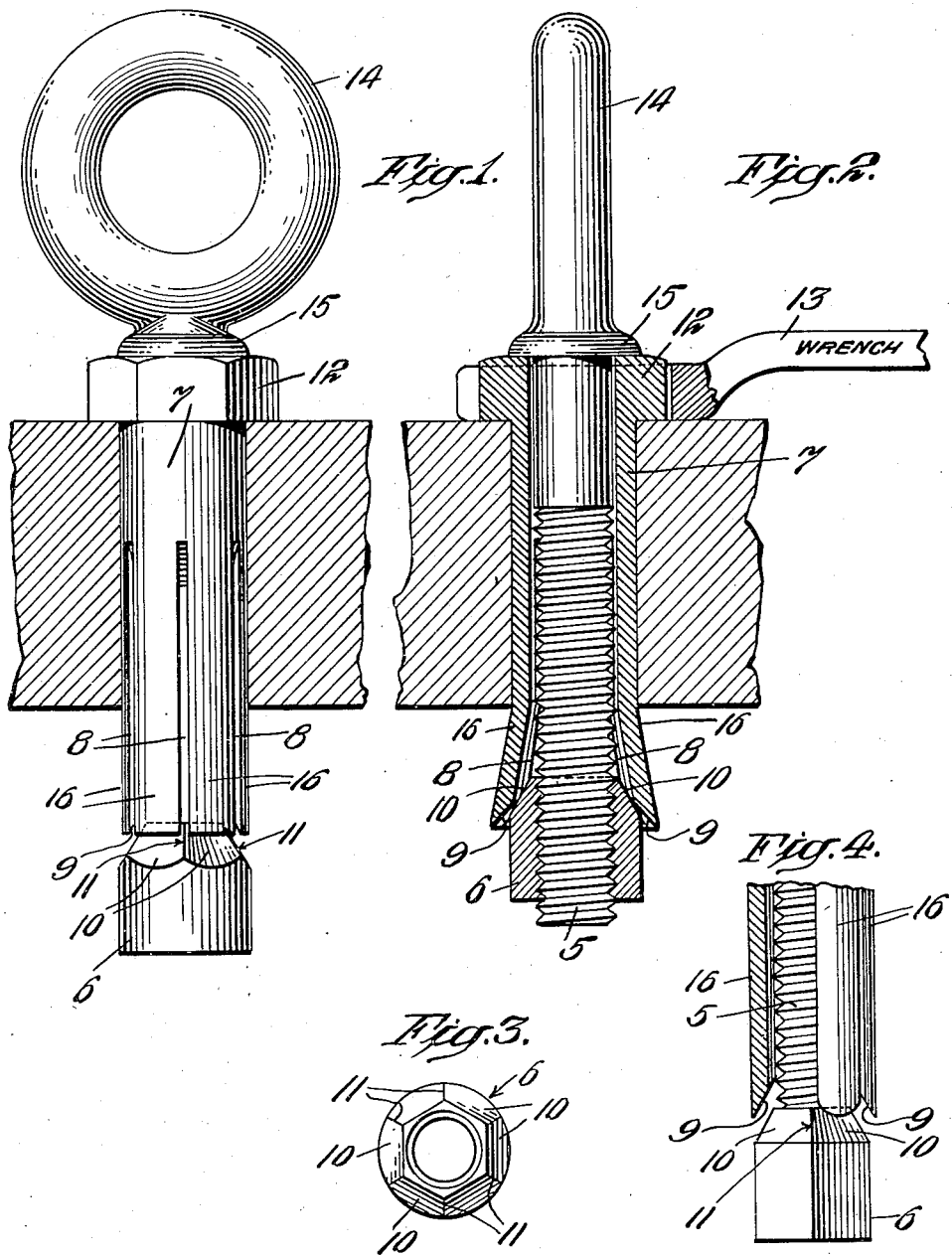

2,343,283

UNITED STATES PATENT OFFICE 2,343,283

SCREW FASTENING WITH SELF-RIVETING HEAD

Frank L. Davis, College Point, Long Island, N. Y.

Application September 23, 1943, Serial No. 503,572

1 Claim. (Cl. 85—40)

The invention here disclosed relates to screw fastenings for securing parts together, for anchoring bolts or screws in a stationary object or in an object which is to be lifted and to devices generally of this character.

The objects of the invention are to provide a fastening which may be entered in a seat or passage and then be manipulated wholly from the one end and particularly to provide such a fastening, which will be sure and certain in its action and form an absolutely secure connection.

Other desirable objects will appear in the course of the following specification.

The drawing accompanying and forming part of the specification illustrates present commercial embodiments of the invention. The structure however may be further modified and changed as regards this particular disclosure, all within the true intent and broad scope of the invention as hereinafter defined and claimed.

Fig. 1 in the drawing is a side elevation, showing a lifting bolt embodiment of the invention entered in a seat in the material to which it is to be fastened, such material being indicated in cross-section.

Fig. 2 is a similar view, indicating the expansion sleeve held by a wrench and said sleeve and the expander nut shown in section.

Fig. 3 is an end view of the nut member of the combination.

Fig. 4 is a broken part sectional side elevation of another form of the invention.

In the illustration, 5 designates a bolt member, 6 a nut member and 7 a sleeve engaged on the bolt above the nut.

The bolt may be of any type suited to the purpose of the fastening, the essential feature being that it is a screw-threaded element.

The nut member is shown in Figs. 1 and 3, as cylindrical in shape and as having an outside diameter approximating that of the expansion sleeve.

A coactive relationship is established between the sleeve and nut by longitudinally slotting the sleeve at 8 and bevelling the end of the same at 9, to match the inwardly convergent flat wedge faces 10, on the end of the nut.

The inwardly convergent flat inclines 10, form sharp inclined ridges 11, at their meeting edges and it is a feature of this invention that these sharp edges equal in number and spacing the slots 8, in the end of the sleeve. This is for the purpose of creating an interlock between the nut and the sleeve, so that the nut will be arrested and held against turning by engagement against the end of the sleeve and so that each wedge face will engage and coact with one of the strips of material in the sleeve, between adjoining slots. This individualizing of a wedge plane to an expansion strip localizes the spreading force and in effect concentrates the action of each wedge incline on a particular expansion strip insuring quicker, more effective and more powerful expanding operations.

The sleeve may have some special provision for holding it against turning, such as the hexagonal head indicated at 12, adapted to be engaged by a wrench 13.

The bolt or screw member may have a head suited to the particular purpose for which the fastening is to be used, it being shown as having a ring or eye 14, as for hoisting or anchorage purposes. This eyebolt structure is shown as having a simple abutment flange 15, engaged with the head on the outer end of the sleeve.

As indicated in Fig. 1, the fastening may be employed in any situation where a seat is present or can be provided for the nut and sleeve portions of the device. The action of securing the fastening can usually be started by hand, by holding the exposed head of the sleeve and turning the bolt while drawing it outward to bring or keep the end of the nut engaged with the end of the sleeve. With this engagement between the nut and end of the sleeve, the sharp inclined edges 11 of the nut will mesh with and enter into the slots to create a non-rotatable relation between the sleeve and nut, enabling the sleeve to hold the nut against rotation when the bolt is turned. This interlock between the nut and sleeve increases as the inclined end planes 10, of the nut pass beneath the expansion strips 16. As soon as the slotted sleeve commences to expand and grip the work or part in which it is seated, in many cases, it need no longer be held against rotation. However, at the start, a wrench may be required for holding the sleeve while the bolt is turned to draw the nut into sleeve expanding relation.

Fig. 2 illustrates a condition in which the sleeve is only partly expanded. The nut may be drawn up to expand the split end of the sleeve to any desired extent, this depending largely on the character of the material and the form and dimensions of the seat in which the fastening is used.

The interaction between the flat wedge faces of the nut and the individual expansion strips of the sleeve holds the nut so firmly that the bolt may be turned to back off the nut sufficiently to permit collapse of the expansion strips for withdrawing the fastening from the seat in which it has been anchored, enabling the entire fastening to be removed when that is desired.

Additional coaction and interlock between the sleeve and nut may be provided by forming the ends of the expansion strips with flat inclines 17, Fig. 4, to match the flat end inclines of the nut. Also, the sides of the nut may be in the form of flat planes 18, Fig. 4, matching the flat end inclines, so that after expansion by the wedges 16, the individual strips of the slotted sleeve will ride over flat planes on the circumference of the nut.

The number and arrangement of the inclined end planes of the nut and segregated expansion strips of the sleeve may vary. In the illustration, a hexagonal construction is shown, the nut having six equal inwardly inclined wedge planes and six intermediate sharp inclined edges 11, and the sleeve having six separate longitudinal matching strips 16 and slots 8.

What is claimed is:

A screw operated fastening in the nature of a rivet and comprising a rivet tube to pass through a hole in the material to be riveted, said tube having an enlarged head at one end to engage over the outer face of the material and slotted inwardly from the opposite end into a plurality of segments to be spread over the inner face of the material, the head of said rivet tube having means for enabling holding of the same against rotation, a bolt extended inward through the headed end of the tube, said bolt having a head in abutting engagement with the head portion of the tube and provided with means for effecting rotation of the bolt within the tube while the tube is held against rotation, said bolt having a screw-threaded portion within the slotted end portion of the tube, and a nut engaged on said screw-threaded portion of the bolt beyond the slotted end of the tube and of no greater external diameter than the tube, to be thereby capable of being passed through a hole in the material ahead of the tube for positioning the separated end segments of the tube inward beyond the inner face of the material, the end of the nut opposed to the slotted end of the tube being composed of inwardly inclined radially convergent flat wedge faces tapered radially inwardly toward the bolt, said radially disposed inclined flat wedge faces equalling in number the number of the tube segments and having radially extending inwardly inclined sharp corners at their meeting edges equal in number to the number of slots in the end of the tube to thereby enter the slots between the segments when the end of the nut is engaged with the slotted end of the tube by rotation of the bolt within the tube, whereby to effect automatic holding of the nut against rotation and alignment of the wedge faces with the ends of the tube segments.

FRANK L. DAVIS.